United States Patent [19]
Iwama

[11] Patent Number: 5,210,634
[45] Date of Patent: *May 11, 1993

[54] LIGHT BEAM SCANNER

[75] Inventor: Masatoshi Iwama, Tokyo, Japan

[73] Assignee: Asahi Kogaku Kogyo K.K., Tokyo, Japan

[*] Notice: The portion of the term of this patent subsequent to May 14, 2008 has been disclaimed.

[21] Appl. No.: 701,013

[22] Filed: May 13, 1991

Related U.S. Application Data

[63] Continuation of Ser. No. 431,066, Nov. 3, 1989, abandoned.

[30] Foreign Application Priority Data

May 16, 1989 [JP] Japan .................. 1-121795

[51] Int. Cl.$^5$ .................. G02B 26/08; H01J 5/16
[52] U.S. Cl. .................. 359/196; 359/216; 250/227.31; 250/235
[58] Field of Search .................. 350/6.5–6.91, 350/96.29, 96.3, 96.31, 6.1; 250/227.31, 234, 560; 355/1, 8; 346/106, 154, 160, 76 L; 359/196–226

[56] References Cited

U.S. PATENT DOCUMENTS

| | | | |
|---|---|---|---|
| 3,848,087 | 11/1974 | Carrell | 358/413 |
| 4,019,186 | 4/1977 | Dressen et al. | 346/108 |
| 4,371,897 | 2/1983 | Kramer | 250/227.31 |
| 4,441,126 | 4/1984 | Greenig et al. | 358/481 |
| 4,549,784 | 10/1985 | Inokuchi | 355/1 |
| 4,602,154 | 7/1986 | Taniguchi | 250/235 |
| 4,638,156 | 1/1987 | Horikawa et al. | 250/235 |
| 4,661,699 | 4/1987 | Welmers et al. | 250/235 |
| 4,700,066 | 10/1987 | Horikawa | 250/235 |
| 4,712,118 | 12/1987 | Seto et al. | 346/160 |
| 4,720,632 | 1/1988 | Kaneko | 250/235 |
| 4,812,013 | 3/1989 | Aurouet et al. | 350/96.29 |
| 4,853,535 | 8/1989 | Suganuma | 250/235 |
| 5,015,846 | 5/1991 | Okuyama et al. | 250/235 |
| 5,070,237 | 12/1991 | Okuyama et al. | 250/227.31 |

FOREIGN PATENT DOCUMENTS 3119570 12/1982 Fed. Rep. of Germany .
1399701 7/1975 United Kingdom .

Primary Examiner—Bruce Y. Arnold
Assistant Examiner—Thong Nguyen
Attorney, Agent, or Firm—Sughrue, Mion, Zinn, Macpeak & Seas

[57] ABSTRACT

A light beam emitted from a light source such as a semiconductor laser, is irradiated onto a recording section such as a photosensitive drum, through a scanning section composed of a rotary polygonal mirror. In a predetermined position in a plane formed by the scanning light beam, a columnar fluorescent optical fiber is arranged perpendicular to this plane, containing fluorescent substances therein. The fluorescent substances generate fluorescent light when the light beam is incident onto these fluorescent substances which is received by the photodetector arranged on the end face of the fluorescent optical fiber. As a result, even when a reflecting face of the rotary polygonal mirror is inclined irregularly, the light beam is incident to the fluorescent optical fiber so that it is not necessary to adjust the position of the fluorescent optical fiber.

7 Claims, 2 Drawing Sheets

LIGHT BEAM SCANNER

This is a continuation of application Ser. No. 07/431,066 filed Nov. 3, 1989 now abandoned.

BACKGROUND OF THE INVENTION

The present invention relates to a light beam scanner such as a laser printer for scanning a recording surface by a laser to record a picture image thereon.

FIG. 2 is a perspective view of an optical system showing one example of a conventional laser printer in which a light source 1 such as a semiconductor laser, etc., emits a laser beam as a light beam. A rotary polygonal mirror 2 is used as a scanning section, and a photosensitive drum 3 has a recording surface with photodetector 4 arranged in the vicinity thereof.

The laser beam emitted from light source 1 is reflected by rotary polygonal mirror 2, and is irradiated onto photosensitive drum 3. The scanning operation is performed by the laser beam in a main scanning direction parallel to the rotary axis of photosensitive drum 3 according to the rotation of rotary polygonal mirror 2. Rotary photosensitive drum 3 is also rotated in an auxiliary scanning direction around the rotary axis thereof. Thus, a predetermined image is recorded onto photosensitive drum 3 by the laser beam which is on/off-modulated corresponding to a recording signal.

Photodetector 4 is arranged in a predetermined position on the scanning plane of the laser beam. The scanning position (i.e., the rotary position of rotary polygonal mirror 2) of the laser beam is controlled with the position of photodetector 4 as a reference, thereby providing an image without shift.

However, in the conventional light beam scanner as mentioned above, the scanning position of the laser beam is detected by photodetector 4. As a result, when a reflecting face of rotary polygonal mirror 2 is inclined from its regular position, the laser beam is not incident on photodetector 4. Consequently, it becomes necessary to adjust the attaching position of photodetector 4, which is inconvenient and time-consuming. The impact of the irregular inclination of the reflecting face of rotary polygonal mirror 2 can be reduced by making photodetector 4 large-sized, for example, but the cost of the scanner is increased by such a construction.

To solve the above-mentioned problems, an object of the present invention is to provide a light beam scanner in which the cost of the scanner is not increased substantially over conventional scanners, and yet, in which it is unnecessary to adjust the position of the photodetector 4 in order to make the laser beam incident thereto.

SUMMARY OF THE INVENTION

In order to achieve the above object, the present invention resides in a light beam scanner having a light source for generating a light beam; a recording section for receiving the light beam emitted from the light source; a scanning section for scanning of the recording section in a predetermined position thereof by the light beam emitted from the light source; a fluorescent optical fiber arranged to be approximately perpendicular to the scanning direction of the light beam by the scanning section; and a photodetector arranged on at least one end face of the fluorescent optical fiber and receiving fluorescent light generated within the fluorescent optical fiber.

The light beam emitted from the light source such as a semiconductor laser, etc. is irradiated onto the recording section such as a photosensitive drum, etc., through the scanning section composed of a rotary polygonal mirror, etc. In a predetermined position in a plane formed by the scanning light beam, a columnar fluorescent optical fiber, for example, is arranged perpendicular to this plane. This fluorescent optical fiber contains fluorescent substances therein, and the fluorescent substances generate fluorescent light when the light beam is incident onto these fluorescent substances. This fluorescent light is received by the photodetector arranged on the end face of the fluorescent optical fiber. The scanning operation by the rotary polygonal mirror is performed using an output of the photodetector as a reference of the predetermined position of the recording drum.

Accordingly, even when a reflecting face of the rotary polygonal mirror is inclined irregularly, the light beam is incident on the fluorescent optical fiber so that it is not necessary to adjust the position of the fluorescent optical fiber.

BRIEF DESCRIPTION OF THE DRAWINGS

The above and other objects, features, and advantages of this invention will become more apparent from the following detailed description when read in conjunction with the accompanying drawings in which.

DETAILED DESCRIPTION

Figure 1:
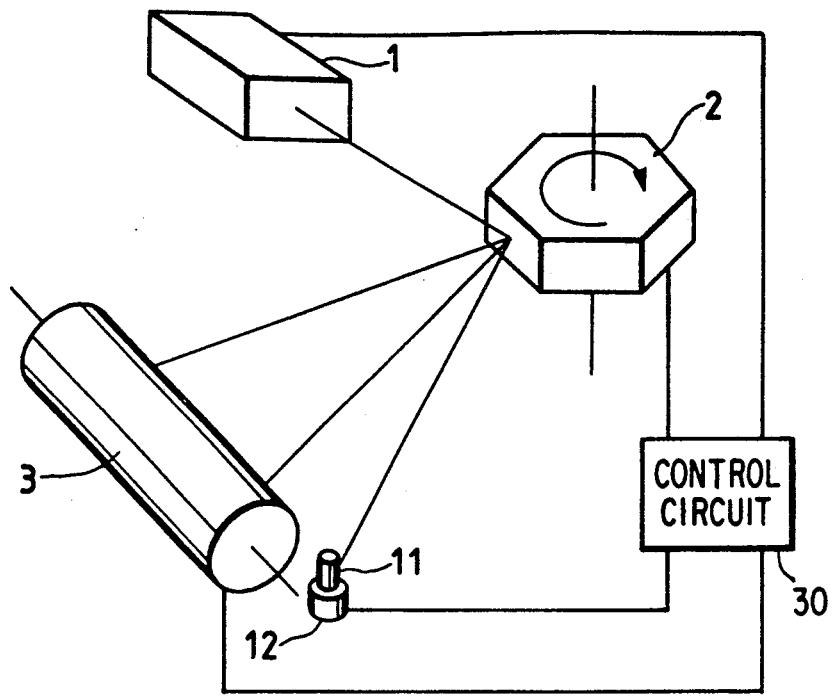
FIG. 1 is a perspective view of an optical system in one embodiment of a light beam scanner in the present invention.
Figure 2:
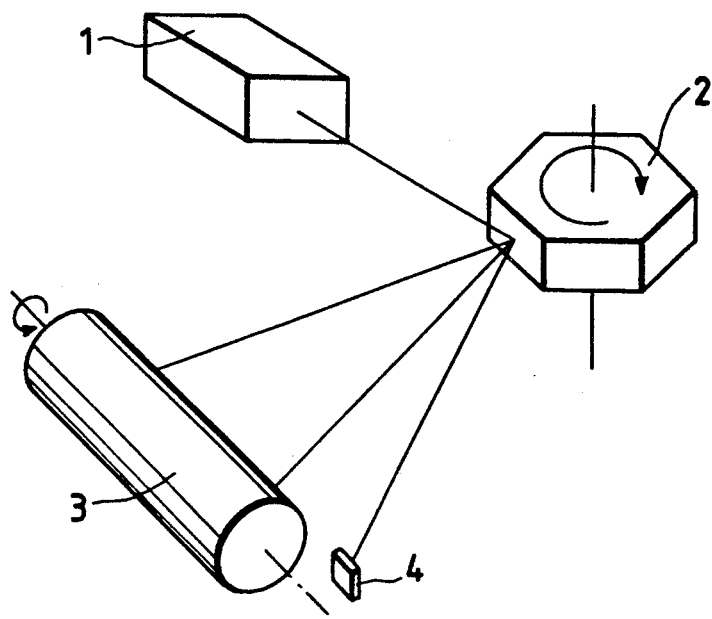
FIG. 2 is a perspective view of an example of an optical system in a conventional light beam scanner.

FIG. 1 shows an optical system in one embodiment of a light beam scanner in the present invention in which portions corresponding to those in FIG. 2 are designated by the same reference numerals, and in which a columnar fluorescent optical fiber 11 has photodetector 12 arranged on at least one end face of fluorescent optical fiber 11. Fluorescent optical fiber 11 is arranged in a predetermined position in the scanning plane by rotary polygonal mirror 2, and is approximately perpendicular to the scanning plane. The fluorescent optical fiber 11 is arranged forward of photosensitive drum 3 with respect to the scanning direction of a laser beam.

Figure 3:
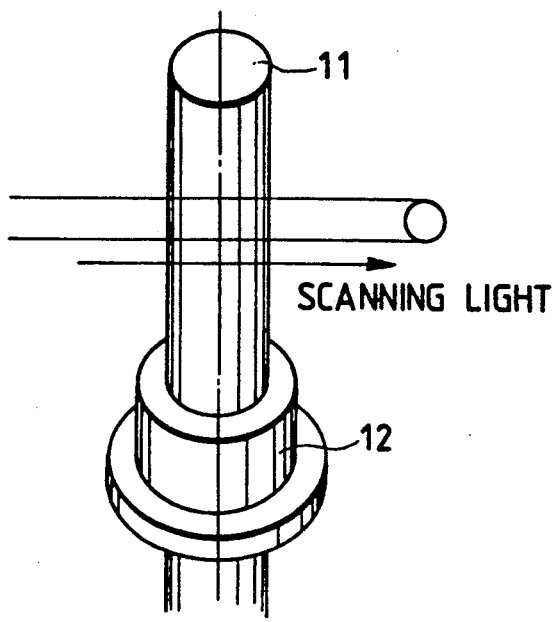
FIG. 3 is an enlarged perspective view of a fluorescent optical fiber and a photodetector in the light beam scanner of the present invention.

With such a construction, even when a reflecting face of the rotary polygonal mirror 2 is inclined irregularly and the incident position of the laser beam is shifted in a direction perpendicular to the scanning plane, fluorescent optical fiber 11 is extended in the direction perpendicular to the scanning direction, as shown in FIG. 3, so that the laser beam is still incident to the fluorescent optical fiber 11 from a side face thereof at any time.

Figure 5:
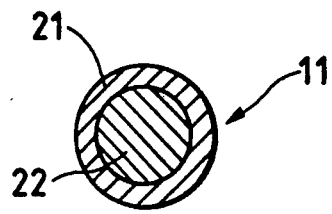
FIG. 5 is a cross-sectional view of the fluorescent optical fiber in the present invention.
Figure 4:
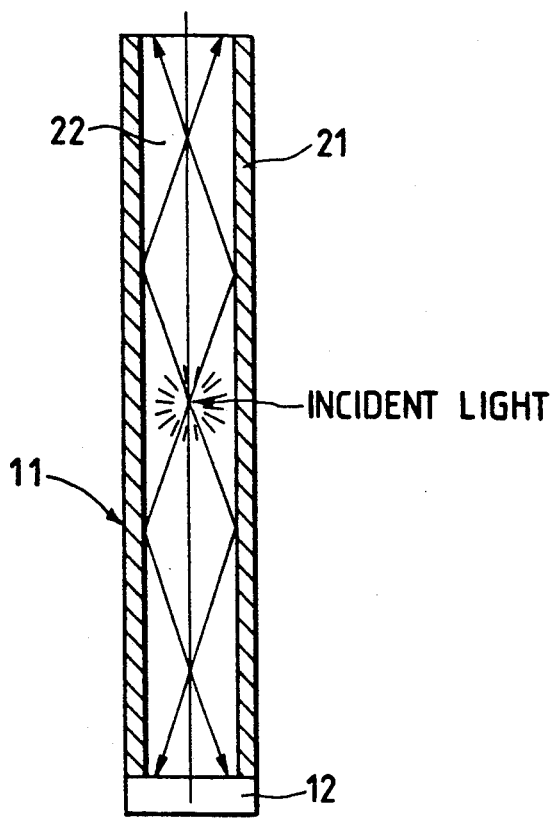
FIG. 4 is a longitudinally cross-sectional view of the fluorescent optical fiber in the present invention.

Fluorescent optical fiber 11 is constructed as shown in FIGS. 4 and 5, and in which member 21 is constructed of glass, resin, etc., for example, and is approximately cylindrical. Member 22 is also constructed of glass, resin, etc., and is formed within member 21. The refractive index of member 22 is greater than that of member 21. Fluorescent substances for absorbing the incident light are uniformly mixed within member 22.

The laser beam made incident on the side face of fluorescent optical fiber 11 by rotary polygonal mirror 2 transmits through member 21, and is incident to member 22. Since member 22 includes the fluorescent substances, this incident light is absorbed by the fluorescent substances, and the fluorescent substances thereby generate fluorescent light.

As mentioned above, since the refractive index of member 22 is greater than that of member 21, the fluorescent light generated within member 22 is reflected by the inside face of member 21, and, accordingly, the fluorescent light cannot be transmitted through member 21. Thus, the fluorescent light is transmitted towards the end faces of member 22. Accordingly, this fluorescent light is detected by photodetector 12 arranged on the lower end face of member 22. Thereafter, the scanning position of the laser beam can be detected by an output of photodetector 12.

Figure 6:
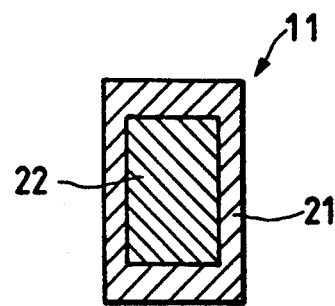
FIG. 6 is a cross-sectional view of another embodiment of the fluorescent optical fiber in the present invention.

In the above-mentioned embodiment, fluorescent optical fiber 11 is approximately cylindrical, but may be square-shaped or rectangular-shaped in cross-section and thereby in the shape of a square pole or a rectangular pole, as shown in FIG. 6. FIG. 1 also shows a control circuit 30 which controls the light source 1 based on an output from the photodetector 12, and which also controls the drum 3 and the rotary polygonal mirror 2.

As mentioned above, in the light beam scanner of the present invention, the scanning position of the light beam is detected by detecting the output of the fluorescent optical fiber 11 arranged to be approximately perpendicular to the scanning direction of the light beam by the photodetector 12. Accordingly, even when a reflecting face of the rotary polygonal mirror 2, etc. used as a scanning section is irregularly inclined, the light beam can be incident to the fluorescent optical fiber 11 at all times by setting the length of the fluorescent optical fiber 11 appropriately. Therefore, it is not necessary to adjust the position of the photodetector 12, and the cost of the scanner is increased minutely.

While certain preferred embodiments have been shown and described, many changes and modifications within the spirit of the invention will be apparent to those of working skill in this technical field. Thus, the scope of the invention should be considered as limited only by the appended claims.

What is claimed is:

1. A light beam scanner, comprising:

light source means for generating a light beam;

recording means for receiving said light beam emitted from said light source means;

scanning means for scanning said recording means in a predetermined position thereof by deflecting said light beam emitted from said light source means;

a fluorescent optical fiber, arranged to be aproximately perpendicular to a scanning direction of the light beam as defined by said scanning means, for generating fluorescent light in response to said light beam, said fluorescent optical fiber being arranged in a predetermined position on a scanning plane of said scanning means, wherein said fluorescent optical fiber is positioned forward of said recording means with respect to a scanning direction of said light beam; and photodetector means, arranged on at least one end face of said fluorescent optical fiber, for receiving said fluorescent light generating within said fluorescent optical fiber, said photodetector generating an output at least indicative of said predetermined position of said recording means being scanned, wherein a scanning operation by said scanning means is controlled based on at least said output of said photodetector means.

2. A light beam scanner as defined in claim 1 wherein said fluorescent optical fiber is cylindrical in shape.

3. A light beam scanner as defined in claim 1 wherein said fluorescent optical fiber is rectangular in shape.

4. A light beam scanner as defined in claim 1 wherein said scanning means comprises a rotary polygonal mirror.

5. A light beam scanner as defined in claim 1, wherein said fluorescent optical fiber comprises first and second members, said first member being formed within said second member.

6. A light beam scanner as defined in claim 5, wherein said first member has a refractive index higher than that of said second member.

7. A light beam scanner as defined in claim 5, wherein said first member comprises fluorescent substances uniformly mixed therein.

* * * * *